(12) United States Patent
Arndt

(10) Patent No.: US 6,725,284 B2
(45) Date of Patent: Apr. 20, 2004

(54) LOGICAL PARTITION HOSTED VIRTUAL INPUT/OUTPUT USING SHARED TRANSLATION CONTROL ENTRIES

(75) Inventor: Richard Louis Arndt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 10/132,461

(22) Filed: Apr. 25, 2002

(65) Prior Publication Data

US 2003/0204648 A1 Oct. 30, 2003

(51) Int. Cl.$^7$ .......................... G06F 3/00; G06F 12/00; G06F 12/10; G06F 13/00; G06F 15/16

(52) U.S. Cl. .................. 710/5; 710/1; 710/2; 710/3; 710/7; 710/20; 710/72; 710/73; 710/74; 710/305; 709/1; 709/100; 709/200; 709/212; 709/213; 709/214; 709/215; 709/216; 709/217; 709/245; 709/319; 711/1; 711/6; 711/100; 711/147; 711/148; 711/173; 711/202; 711/203; 711/206; 711/207; 711/208; 712/1; 712/13; 712/200; 712/220

(58) Field of Search .......................... 710/1–3, 5, 7–9, 710/15, 16, 20, 22, 23, 26, 72–74, 305, 308; 709/1, 100, 200, 212–217, 245, 319, 321, 327; 711/1, 6, 100, 147, 148, 173, 202, 203, 206, 207, 208; 712/1, 13, 200, 220, 225

(56) References Cited

U.S. PATENT DOCUMENTS

| | | | | |
|---|---|---|---|---|
| 5,404,478 A | * | 4/1995 | Arai et al. | 711/206 |
| 5,600,805 A | * | 2/1997 | Fredericks et al. | 710/5 |
| 5,659,756 A | * | 8/1997 | Hefferon et al. | 710/200 |
| 5,860,146 A | * | 1/1999 | Vishin et al. | 711/207 |
| 5,996,026 A | * | 11/1999 | Onodera et al. | 710/3 |
| 6,085,296 A | * | 7/2000 | Karkhanis et al. | 711/147 |
| 6,260,131 B1 | * | 7/2001 | Kikuta et al. | 711/210 |
| 6,279,046 B1 | * | 8/2001 | Armstrong et al. | 710/5 |
| 6,289,432 B1 | * | 9/2001 | Ault et al. | 711/206 |
| 6,629,162 B1 | * | 9/2003 | Arndt et al. | 710/28 |
| 2002/0065989 A1 | * | 5/2002 | Chauvel et al. | 711/130 |
| 2002/0129085 A1 | * | 9/2002 | Kubala et al. | 709/104 |
| 2002/0156989 A1 | * | 10/2002 | Gaertner et al. | 711/207 |
| 2002/0169938 A1 | * | 11/2002 | Scott et al. | 711/207 |
| 2003/0097394 A1 | * | 5/2003 | Chauvel et al. | 709/100 |
| 2003/0110205 A1 | * | 6/2003 | Johnson | 709/104 |
| 2003/0191881 A1 | * | 10/2003 | Arndt et al. | 710/240 |

* cited by examiner

Primary Examiner—Jeffrey Gaffin
Assistant Examiner—Tanh Q. Nguyen
(74) Attorney, Agent, or Firm—Duke W. Yee; Mark E. McBurney (57) ABSTRACT

The present invention provides a method for sharing I/O facilities among logical partitions. A remote translation control entry table is created on a hosted partition appearing to own a virtual copy of the I/O facilities to be shared. The remote translation control entry table on the hosted partition is loaded with data from a hypervisor in response to requests made by the OS running in the hosted partition. The hypervisor, in response to requests from the OS running in the hosting partition, copies the data from the remote translation control entry into a standard translation control entry table on the hosting partition owning the physical I/O facilities that target the I/O page buffers of the hosted partition to perform the desired I/O operation. The I/O page buffers of the hosted partition are accessed by the hosting partition's I/O facilities using the data stored in the standard translation control entry table.

14 Claims, 8 Drawing Sheets

FIG. 1
100 DATA PROCESSING SYSTEM

LOGICAL PARTITION HOSTED VIRTUAL INPUT/OUTPUT USING SHARED TRANSLATION CONTROL ENTRIES

BACKGROUND OF THE INVENTION

1. Technical Field

The present invention relates to an improved data processing system. In particular, the present invention relates to a method, apparatus, and computer instructions for sharing input/output (I/O) facilities owned by a logical partition with other logical partitions.

2. Description of Related Art

Computing platforms that support partitioning, and even more importantly logical partitioning, such as the IBM iSeries and pSeries, often run small independent operating system images known as "hosted partitions". "Hosted partitions" are logical partitions that rely on another one of the platform's logical partitions known as "hosting partitions" to provide some or all of the hosted partition's physical I/O facilities. Several hosted partitions can share the physical I/O facilities, such as for example disk adapters and devices, of the hosting partition. In principal any I/O device owned by a hosting partition may be shared with a hosted partition, these include but are not limited to tape, CD, & DVD drives, Local Area Network adapters such as token ring or ethernet, serial ports and terminals, non-volatile ram, real time clock and timer devices. This invention relates to any of these or other I/O devices that uses Direct Memory Access (DMA) facilities.

The current art of DMA transfers, as practiced by the IBM iSeries and pSeries computer platforms, includes a level of address translation called a translation control entry (TCE) table, per I/O adapter. The TCE tables within logically partitioned platforms are maintained by a platform firmware component known as the hypervisor, which insures that the data within the TCE directs the DMA accesses of I/O adapters to the proper target memory. Currently, the hypervisor requires that this target memory is owned by the partition owning the I/O adapter.

Current art provides a communications path among the various partitions through the hypervisor. This path is used to exchange I/O requests and responses by the means of the hypervisor copying data between the memory, which is owned by the hosted and hosting partitions. The primary responsibility of the hypervisor is to protect one partition's memory from corruption by errors in other partitions. Therefore, the hypervisor must mediate any data movement between partitions to insure that the only data approved by their respective owning partitions are involved. With current art, the only two means available are to copy the data between two buffers, one in the source and one in the destination, or to map a segment of memory for shared access by both partitions. The former requires that when the hosting partition makes an I/O request of the hosted partition, in addition to the direct memory access (DMA) transfer of data to and from the I/O adapter, the hypervisor must copy, using processor loads and stores, the data between hosted and hosting partitions. These data copy operations significantly add to the overhead of doing I/O in a hosted or hosting environment, especially as the size of I/O data associated with an I/O operation increases. The other alternative of mapping a shared segment of storage involves operational problems including significant increase in memory consumption, and difficulty in reclaiming memory in the face of errors.

Therefore, it would be advantageous to have an improved method, apparatus, and computer instructions for logical partitions to share physical I/O facilities with other logical partitions.

SUMMARY OF THE INVENTION

The present invention provides a method, apparatus, and computer implemented instructions for sharing virtual I/O facilities of logical partitions with other logical partitions using shared translation control entries. The present invention creates a remote translation control entry table for a hosted partition, wherein the hosted partition is a logical partition sharing the I/O facilities owned by a hosting partition. The remote translation control entry table of the hosted partition is loaded by the hypervisor in response to request made by the hosted partition's Operating System. The hypervisor copies selected entries from the remote translation control entry table into selected entries in a standard translation control entry table maintained for a hosting partition per requests made by the hosting partition's Operating System, wherein the hosting partition is the logical partition owning the physical I/O facilities making them available to the hosted partition as virtual I/O facilities. These virtual I/O facilities of the hosted partition are realized by the hosting partition's physical I/O facilities, accessing the hosted partition's memory using the data stored in the standard translation control entry table on the hosting partition as copied by the hypervisor from the remote TCE tables of the hosted partition's virtual I/O facilities.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
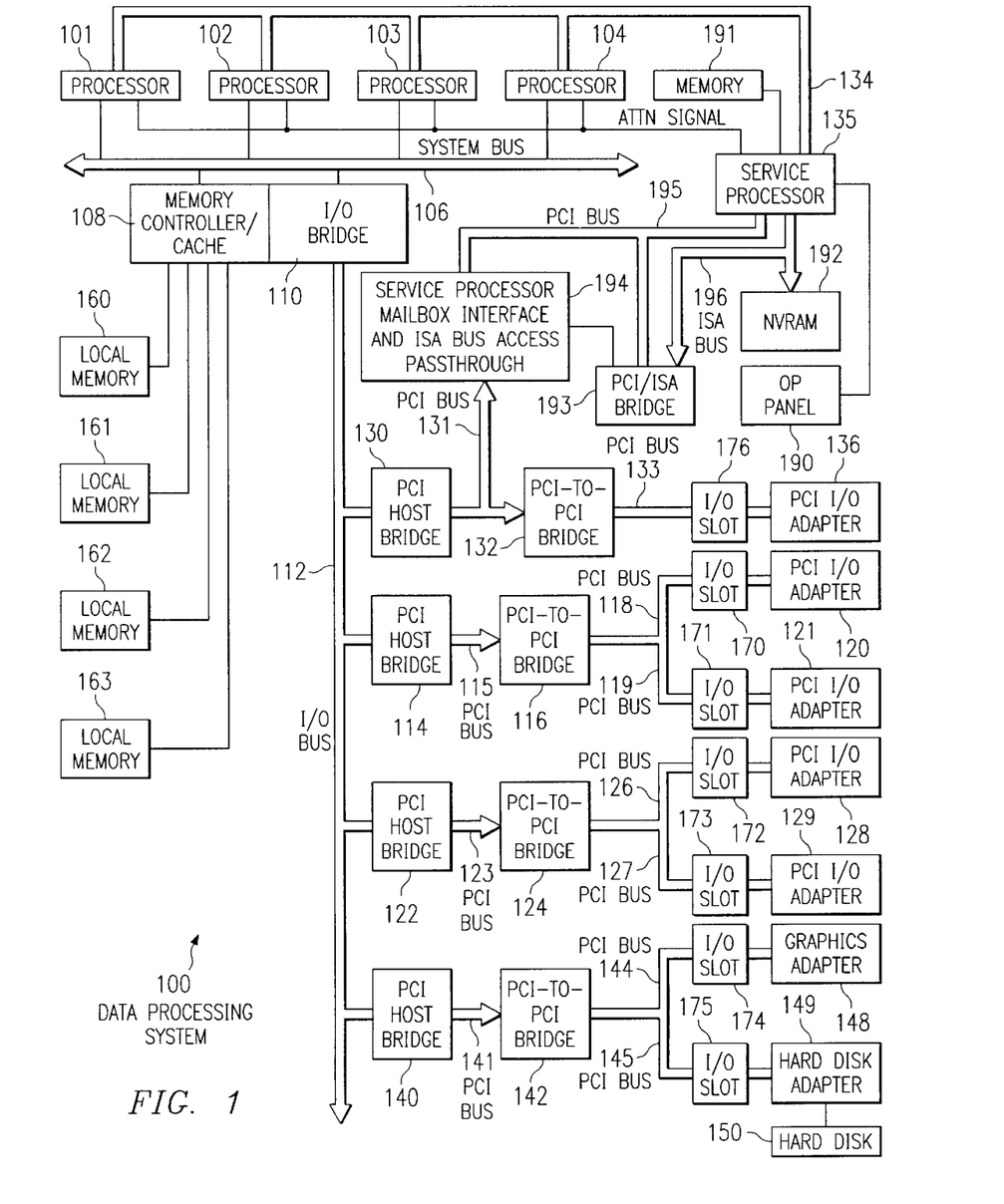
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120–121, 128–129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120–121, 128–129, 136, graphics adapter 148, hard disk adapter 149, each of host processors 101–104, and each of local memories 160–163 is assigned to one of the three partitions. For example, processor 101, local memory 160, and PCI I/O adapters 120, 128, and 129 may be assigned to logical partition P1; processors 102–103, local memory 161, and PCI I/O adapters 121 and 136 may be assigned to partition P2; and processor 104, local memories 162–163, graphics adapter 148 and hard disk adapter 149 may be assigned to logical partition P3.

Each operating system executing within data processing system 100 is assigned to a different logical partition. Thus, for example, one instance of the Advanced Interactive Executive (AIX) operating system may be executing within partition PI, a second instance (image) of the AIX operating system may be executing within partition P2, and a LINUX operating system may be operating within logical partition P1. LINUX is a version of UNIX that runs on a variety of hardware platforms including x86 PCs, Alpha, PowerPC and IBM's product line. Linux is open source software, which is freely available; however, the full distribution of Linux along with technical support and training are available for a fee from vendors such as Red Hat Software and Caldera.

The present invention provides the ability for each operating system executing within data processing system 100 to access I/O units that are outside its logical partition.

Peripheral component interconnect (PCI) host bridge 114 connected to I/O bus 112 provides an interface to PCI local bus 115. A number of PCI I/O adapters 120–121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120–121 provides an interface between data processing system 100 and I/O devices such as, for example, other network computers, which are clients to data processing system 100.

An additional PCI host bridge 122 provides an interface for an additional PCI bus 123. PCI bus 123 is connected to a plurality of PCI I/O adapters 128–129. PCI I/O adapters 128–129 may be connected to PCI bus 123 through PCI-to-PCI bridge 124, PCI bus 126, PCI bus 127, I/O slot 172, and I/O slot 173. PCI-to-PCI bridge 124 provides an interface between PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128–129. In this manner, data processing system 100 allows connections to multiple network computers. A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101–104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190. When data processing system 100 is initially powered up, service processor 135 uses the JTAG/scan I$^2$C busses 134 to interrogate the system (host) processors 101–104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101–104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases the host processors 101–104 for execution of the code loaded into host memory 160–163. While the host processors 101–104 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101–104, local memories 160–163, and I/O bridge 110. Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
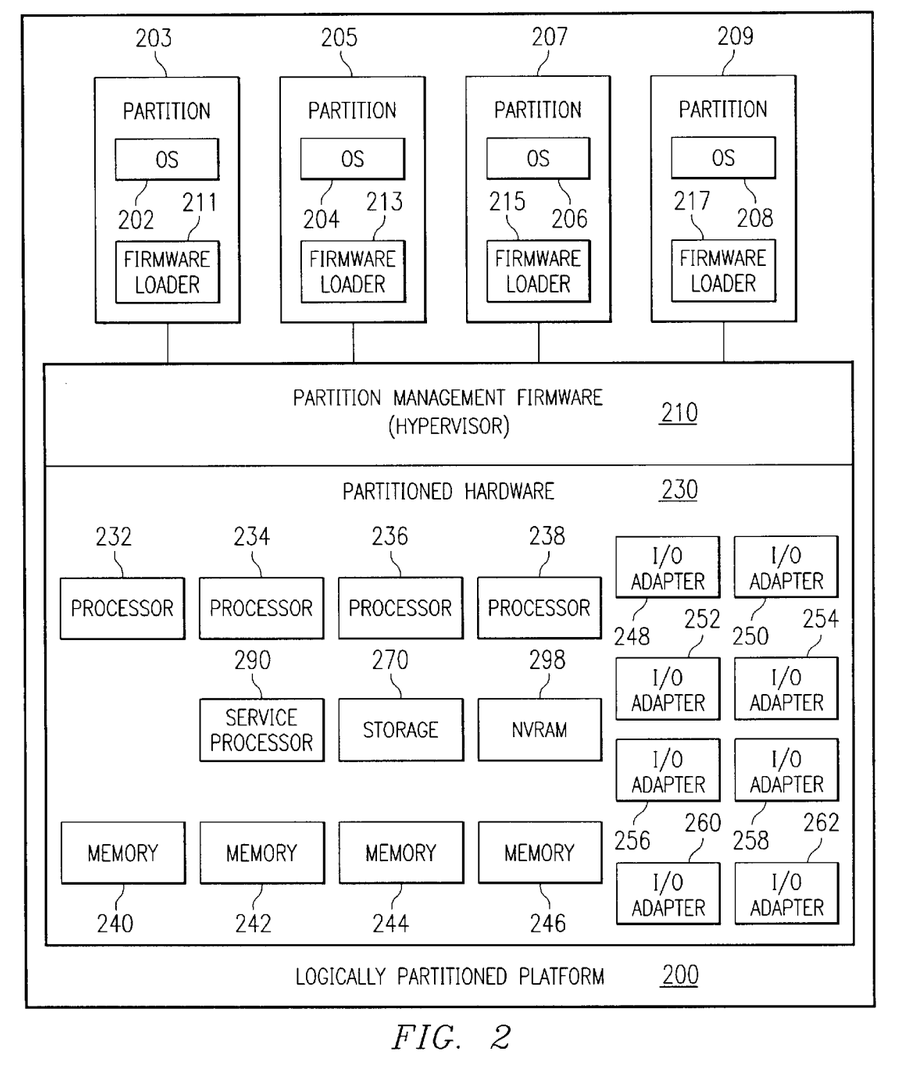
FIG. 2 is a block diagram of an exemplary logically partitioned platform in which the present invention may be implemented.

With reference now to FIG. 2, a block diagram of an exemplary logically partitioned platform is depicted in which the present invention may be implemented. The hardware in logically partitioned platform 200 may be implemented as, for example, data processing system 100 in FIG. 1. Logically partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209. Additionally, these partitions also include firmware loaders 211, 213, 215, and 217. When partitions 203, 205, 207, and 209 are instantiated, a copy of the open firmware is loaded into each partition by the hypervisor's partition manager. The processors associated or assigned to the partitions are then dispatched to the partitions' memory to execute the partition firmware.

Partitioned hardware 230 includes a plurality of processors 232–238, a plurality of system memory units 240–246, a plurality of I/O (I/O) adapters 248–262, and a storage unit 270. Partition hardware 230 also includes service processor 290, which may be used to provide various services, such as processing of errors in the partitions. Each of the processors 232–238, memory units 240–246, NVRAM storage 298, and I/O adapters 248–262 may be assigned to one of multiple partitions within logically partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logically partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 202, 204, 206, and 208 by virtualizing all the hardware resources of logically partitioned platform 200.

Figure 3:
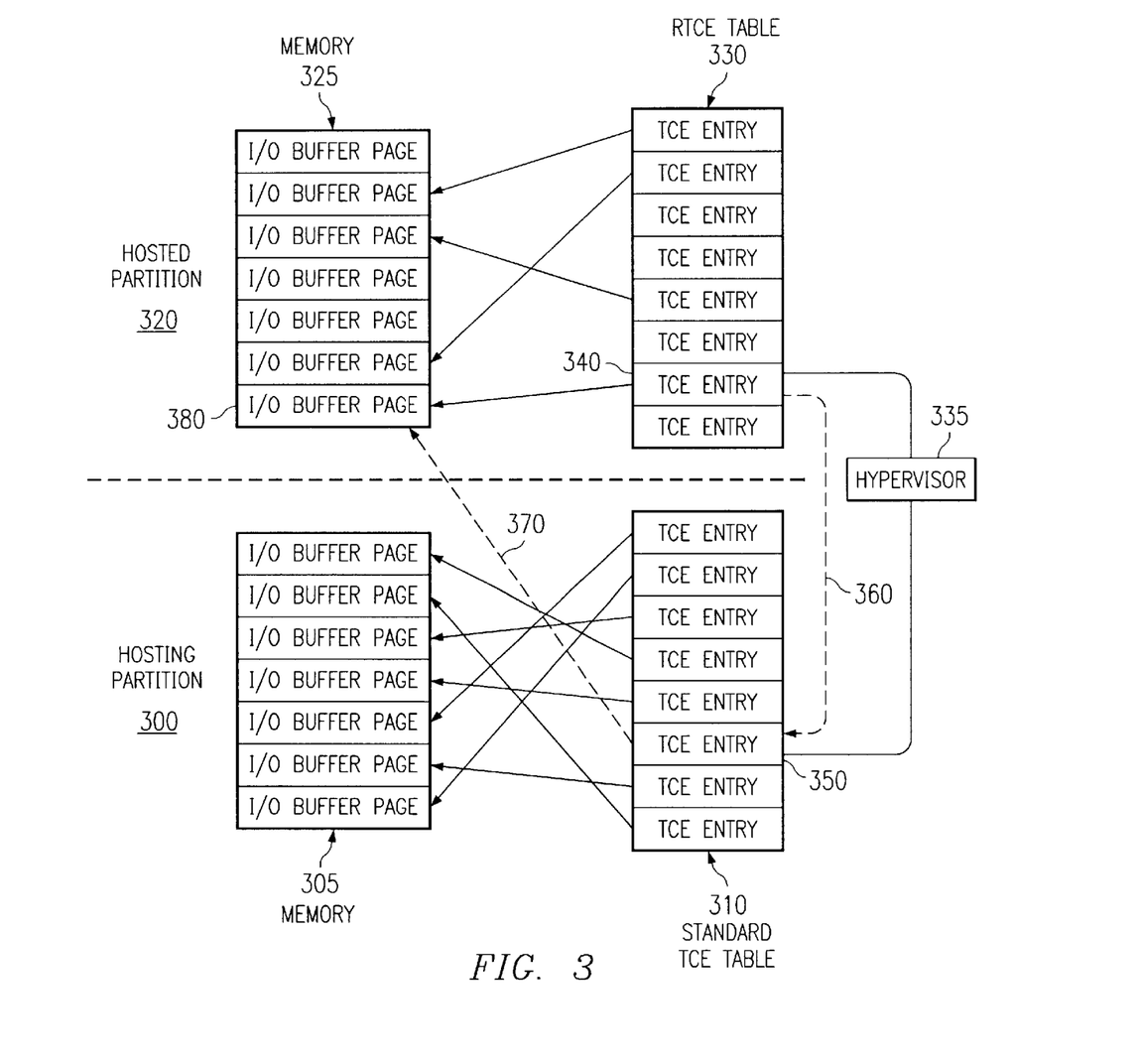
FIG. 3 is a block diagram of a hosting partition and a hosted partition in accordance with a preferred embodiment of the present invention.

FIG. 3 is a block diagram of a hosting partition and a hosted partition in accordance with a preferred embodiment of the present invention. The present invention allows for a hosting partition to securely target DMA operations of an I/O adapter, such as I/O adapters 248–262 in FIG. 2 and PCI I/O adapters 120–121, 128–129 and 136, graphics adapter 148, and hard disk adapter 149 in FIG. 1, directly at the memory pages of a hosted partition.

In this example, hosting partition 300 contains memory 305, which is divided into I/O buffer pages. Hosting partition 300 uses standard TCE table 310 to manage the I/O buffer pages in memory 305.

Hosted partition 320 contains memory 325, which is divided into I/O buffer pages. Hosted partition 320 uses an extended type of TCE table called a remote DMA TCE table (RTCE), such as RTCE table 330, to manage memory 325 that is targeted for use by a hosting partition, such as hosting partition 300.

Hosted partition 320 passes a DMA address space offset to the hosting partition along with the I/O request through the use of hypervisor 335, which translates the DMA addresses of the TCE entries and manages the communication between the partitions. Hypervisor 335 is the partition management firmware, such as, for example, partition management firmware (hypervisor) 210 in FIG. 2.

Hypervisor 335 copies the contents of TCE entry 340 from RTCE table 330 to standard TCE table 310 in TCE entry 350, shown using arrow 360. The hosting partition uses the hypervisor function, called H_PUT RTCE, which takes as a parameter the opaque handle of the RTCE table, such as RTCE table 330, an offset in the RTCE table, such as TCE entry 340, the handle for one of the hosting partition's I/O adapter TCE tables, such as standard TCE table 310, plus an offset within the I/O adapter's TCE table, such as TCE entry 350.

Figure 6:
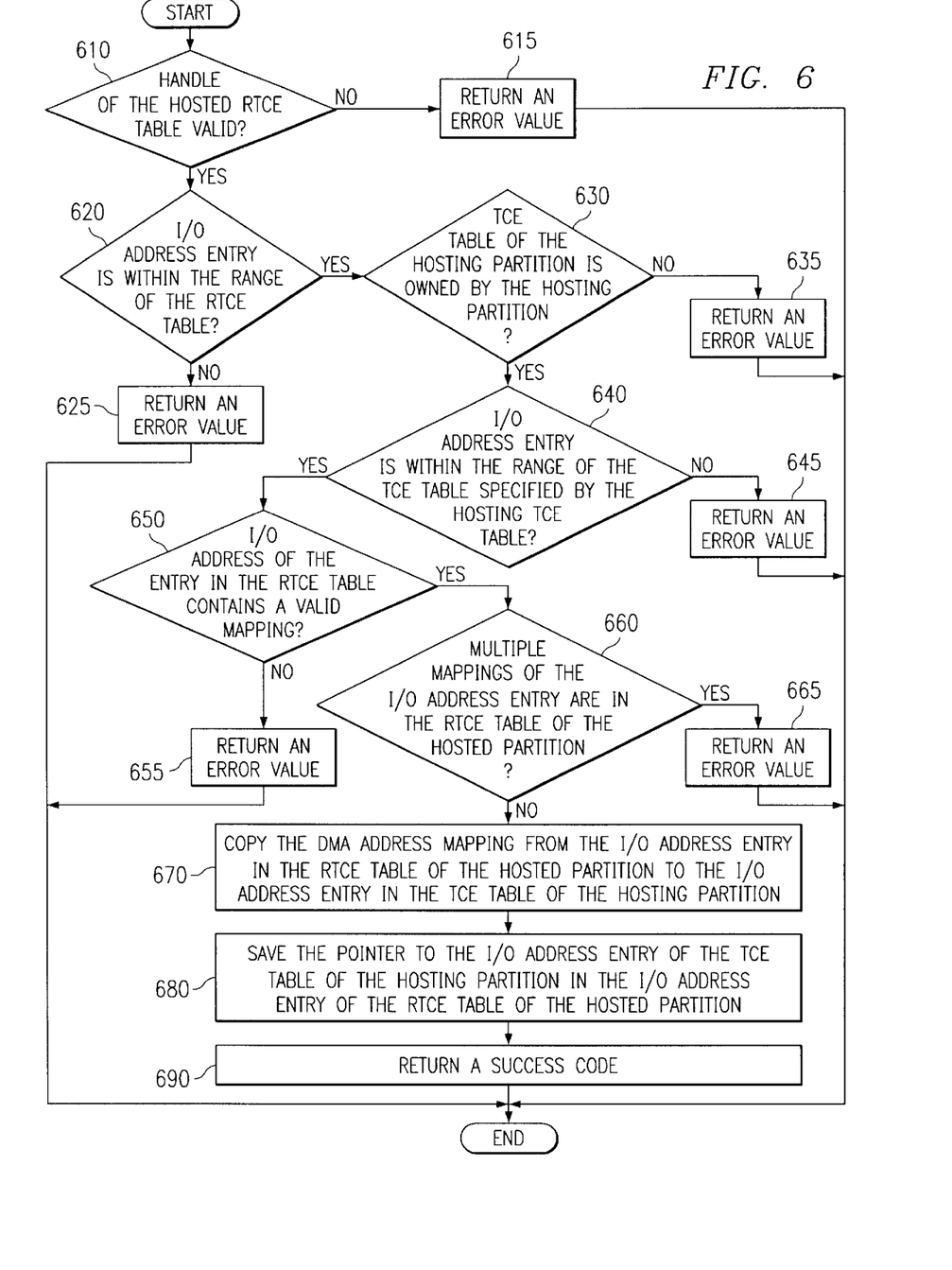
FIG. 6 is a flowchart of the process of the hypervisor to copy a RTCE table entry on the hosted partition to one of the standard I/O adapter (10A) DMA TCE table entries on the hosting partition in accordance with a preferred embodiment of the present invention.

The H_PUT_RTCE function copies a RTCE table entry on a hosted partition to one of the standard TCE table entries on a hosting partition and is described in more detail in FIG. 6.

An "opaque handle" is a name or reference to an entity, which cannot be directly "de-referenced" by the untrusted agents (in this case the operating systems or other programs running in the partition). By resistant to forging, the opaque handle has the characteristic such that an untrusted agent is unlikely to be able to generate, by itself, a value that would be interpreted by the hypervisor as a valid opaque handle to a TCE table. That is the hypervisor could tell by the value itself, whether it had generated the opaque handle or some other agent was trying to "forge" a handle to a TCE table. There are several methods known to the art for creating handles that are resistant to forging. These methods differ in the degree of resistance they provide.

Shown with arrow 370, hosting partition 300's I/O devices then uses the contents of TCE entry 350 to access I/O buffer page 380 in memory 325 of hosted partition 320.

Hosting partition 300 and hosted partition 320 are logical partitions or segments of memory, such as local memory 160, 161, 162, and 163 in FIG. 1, memory 240, 242, 244, and 246, and I/O adapters 248–262 in FIG. 2. Additionally, hosting partition 300 and hosted partition 320 could be located on separate computers, provided that means for directly accessing the memories of the separate computers from their partners were included. For example, hosting partition 300 could be located on a client computer and hosted partition 320 could be located on a server computer.

Figure 4:
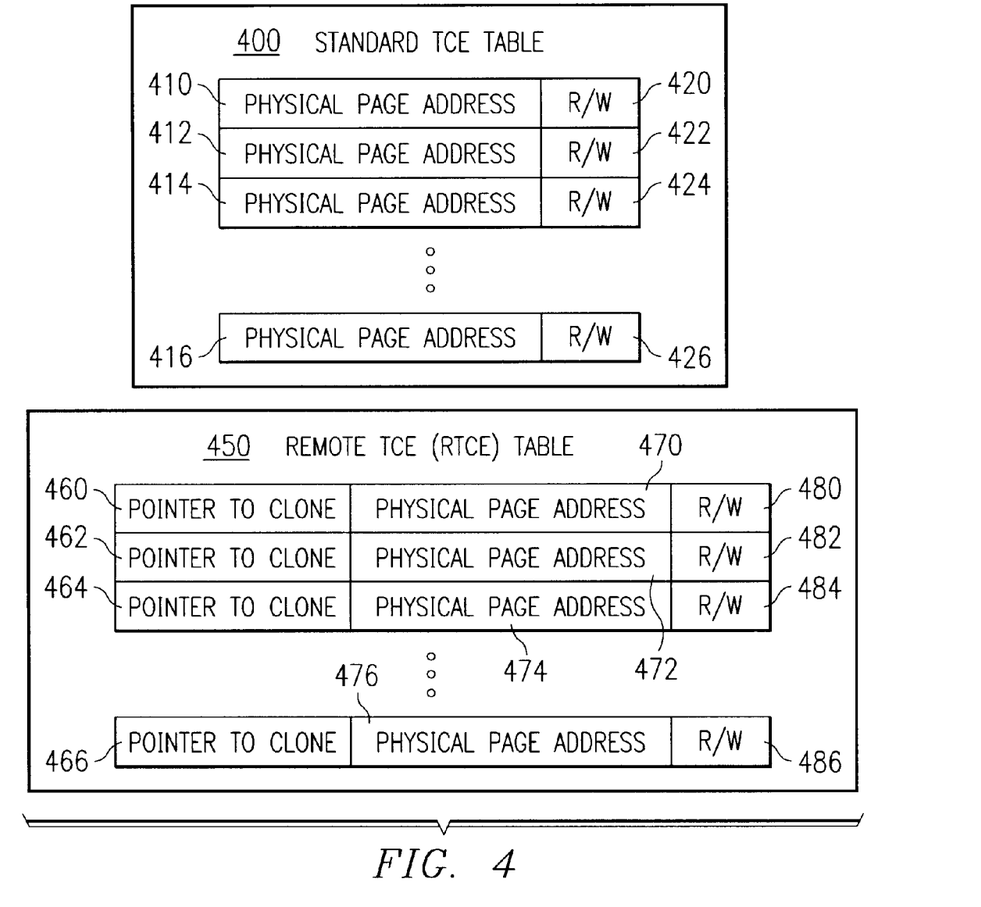
FIG. 4 is a block diagram of a TCE table layout and a remote DMA TCE (RTCE) table layout in accordance with a preferred embodiment of the present invention.

FIG. 4 is a block diagram of the standard TCE table and the remote TCE (RTCE) table layouts in accordance with a preferred embodiment of the present invention.

Standard TCE table 400 contains two fields. The fields in the standard TCE entry are the physical page address of the page buffer, such as physical page address 410–416, and the R/W field, such as R/W 420–426. The R/W field indicates the permissions of the translation entry such as read, write, read and write, or none (indicating an invalid translation entry).

An entry in RTCE table 450 contains a "pointer to clone" field in addition to the fields of the standard TCE table entry. When valid, the pointer to clone field, such as pointer to clone 460–466, points to the standard TCE entry that has been "cloned" with the physical page address and R/W fields of a RTCE table entry. RTCE table 450 also contains physical page address 470–476 and R/W 480–486.

RTCE table 450 has extra data compared to standard TCE table 400 to help manage the mappings for the hosting partitions. Since the hosted partition's RTCE table is never directly accessed by an I/O adapter and is only accessed by the hypervisor, the structure can be larger and contain more fields than the standard TCE table as accessed by hardware.

Figure 5A:
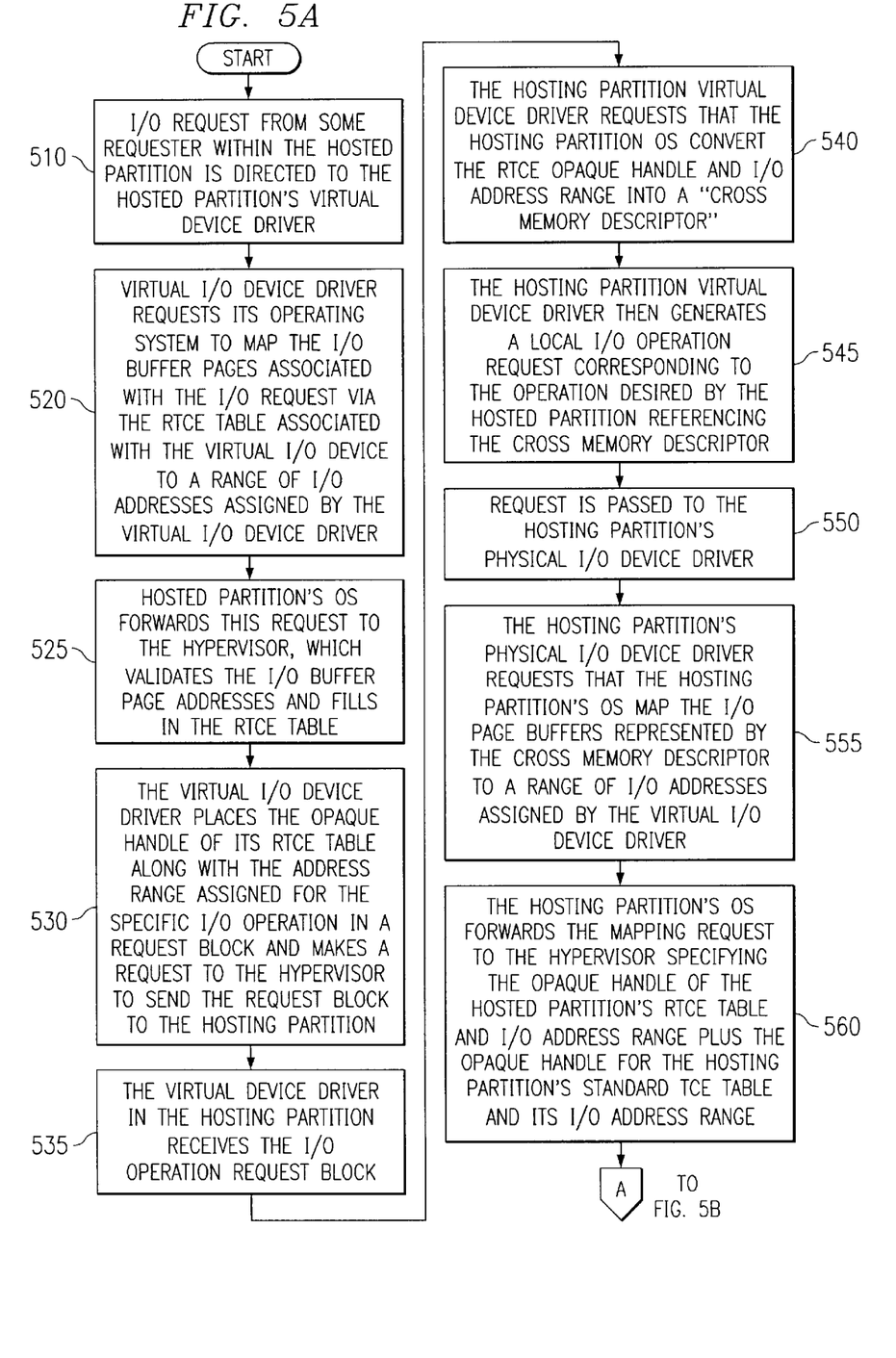
FIGS. 5A and 5B are a flowcharts of the process for a hosting partition to securely target an I/O adapter's DMA operations directly at the memory pages of a hosted partition in accordance with a preferred embodiment of the present invention.
Figures 5B, 8:
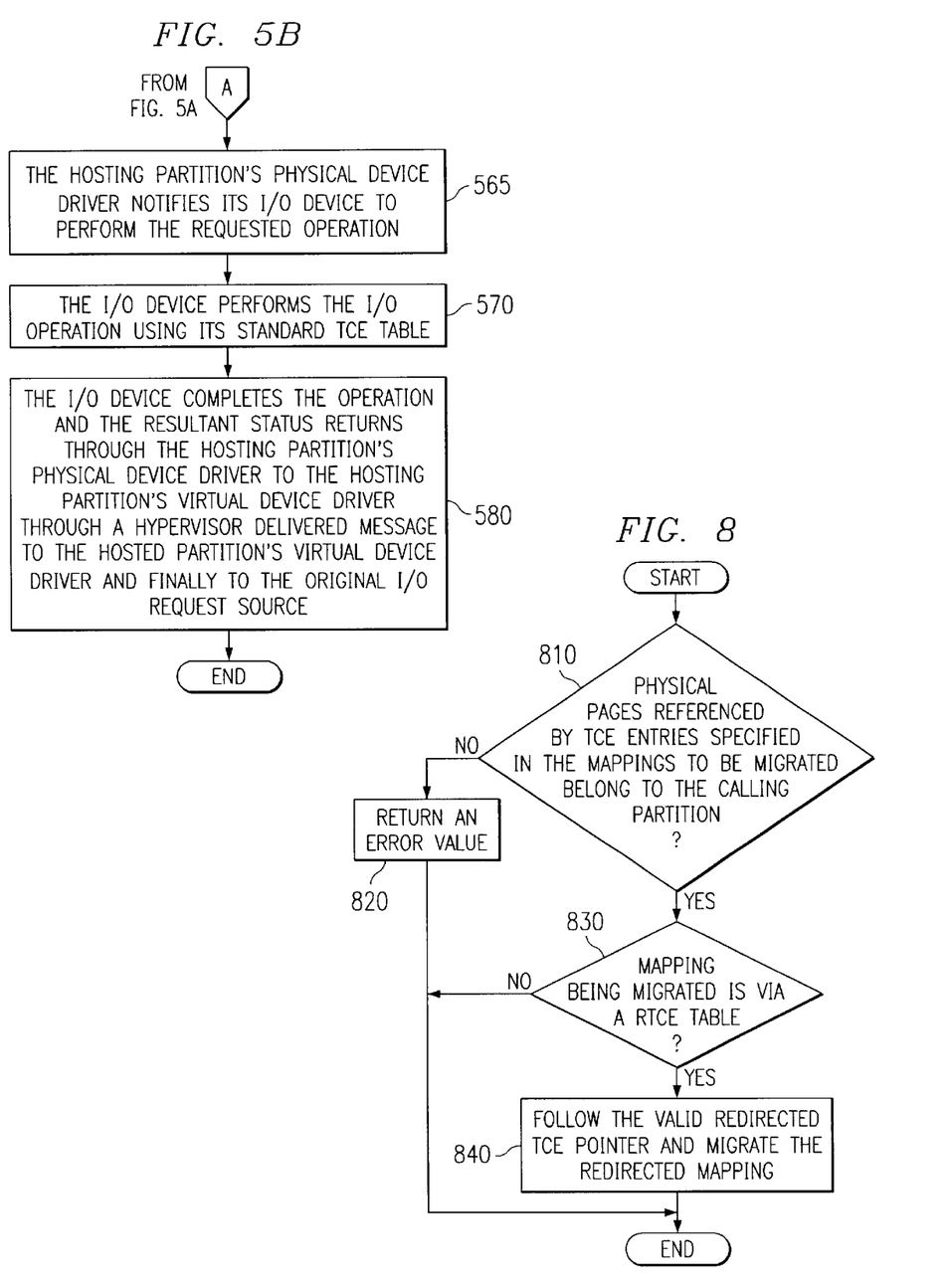
FIG. 8 is a flowchart of additions for the hypervisor current function that migrates DMA mappings in accordance with a preferred embodiment of the present invention.

FIGS. 5A and 5B are flowcharts of the process for a hosting partition to securely target an I/O adapter's DMA operations directly at the memory pages of a hosted partition in accordance with a preferred embodiment of the present invention.

An I/O request from some requester within the hosted partition is directed to the hosted partition's virtual device driver (step 510). The virtual I/O device driver requests its operating system to map the I/O buffer pages associated with the I/O request via the RTCE table associated with the virtual I/O device to a range of I/O addresses assigned by the virtual I/O device driver (step 520). The hosted partition's OS forwards this request to the hypervisor, which validates the I/O buffer page addresses and fills in the RTCE table (step 525). The virtual I/O device driver places the opaque handle of its RTCE table along with the address range assigned for the specific I/O operation in a request block and makes a request to the hypervisor to send the request block to the hosting partition (step 530).

The virtual device driver in the hosting partition receives the I/O operation request block (step 535). The hosting partition virtual device driver requests that the hosting partition OS convert the RTCE opaque handle and I/O address range into a "cross memory descriptor" which will be de-referenced in step 555 (step 540). The hosting partition virtual device driver then generates a local I/O operation request corresponding to the operation desired by the hosted partition referencing the cross memory descriptor (step 545).

This request is passed to the hosting partition's physical I/O device driver (step 550). The hosting partition's physical I/O device driver requests that the hosting partition's OS map the I/O page buffers represented by the cross memory descriptor to a range of I/O addresses assigned by the virtual I/O device driver (step 555). The hosting partition's OS forwards the mapping request to the hypervisor specifying the opaque handle of the hosted partition's RTCE table and I/O address range plus the opaque handle for the hosting partition's standard TCE table and its I/O address range (step 560). The hosting partition's physical device driver notifies its I/O device to perform the requested operation (step 565). The I/O device performs the I/O operation using its standard TCE table (step 570). The I/O device completes the operation and the resultant status returns through the hosting partition's physical device driver to the hosting partition's virtual device driver through a hypervisor delivered message to the hosted partition's virtual device driver and finally to the original I/O request source (step 580) with the process terminating thereafter.

FIG. 6 is a flowchart of the process for the hypervisor to copy a RTCE table entry on the hosted partition to one of the standard I/O adapter (10A) DMA TCE table entries on the hosting partition in accordance with a preferred embodiment of the present invention. The hypervisor function described in FIG. 6 is called H_PUT_RTCE. The H_PUT_RTCE function is invoked when the hosting partition's physical I/O adapter is required to target an I/O buffer page of a hosted partition to perform the resultant I/O operation requested of the virtual I/O adapter owned by the hosted partition.

A determination is made as to whether the handle of the hosted RTCE table is valid (step 610). If the handle is not valid, an error value is returned (step 615) with the process terminating thereafter. Otherwise, a determination is made as to whether the I/O address entry is within the range of the RTCE table (step 620). If the I/O address entry is not within the range of the RTCE table, an error value is returned to the calling procedure (step 625) with the process terminating thereafter. With reference again to step 620, if the I/O address entry is within the range of the RTCE table, a determination is made as to whether the TCE table of the hosting partition is owned by the hosting partition (step 630). If the TCE table is not owned by the hosting partition, an error value is returned to the calling procedure (step 635) with the process terminating thereafter. With reference again to step 630, if the TCE table is owned by the hosting partition, a determination is made as to whether the I/O address entry is within the range of the TCE table specified by the hosting TCE table (step 640). If the I/O entry is not within the range of the TCE table, an error value is returned (step 645) with the process terminating thereafter. With reference back to step 640, if the I/O entry is within the range of the TCE table, a determination is made as to whether the I/O address of the entry in the RTCE table contains a valid mapping (step 650). If the I/O address of the entry in the RTCE table is not valid, an error value is returned (step 655) with the process terminating thereafter.

Turning back to step 650, if the I/O address of the entry in the RTCE table is valid, a determination is made as to whether multiple mappings of the I/O address entry are in the RTCE table of the hosted partition (step 660).

If multiple mappings exist, an error value is returned to the calling procedure (step 665) with the process terminating thereafter. The DMA address mapping from the I/O address entry in the RTCE table of the hosted partition is copied to the I/O address entry in the TCE table of the hosting partition (step 670). The pointer to the I/O address entry of the TCE table of the hosting partition is saved in the I/O address entry of the RTCE table of the hosted partition (step 680), and a success code value is returned to the calling procedure (step 690) with the process terminating thereafter.

Figure 7:
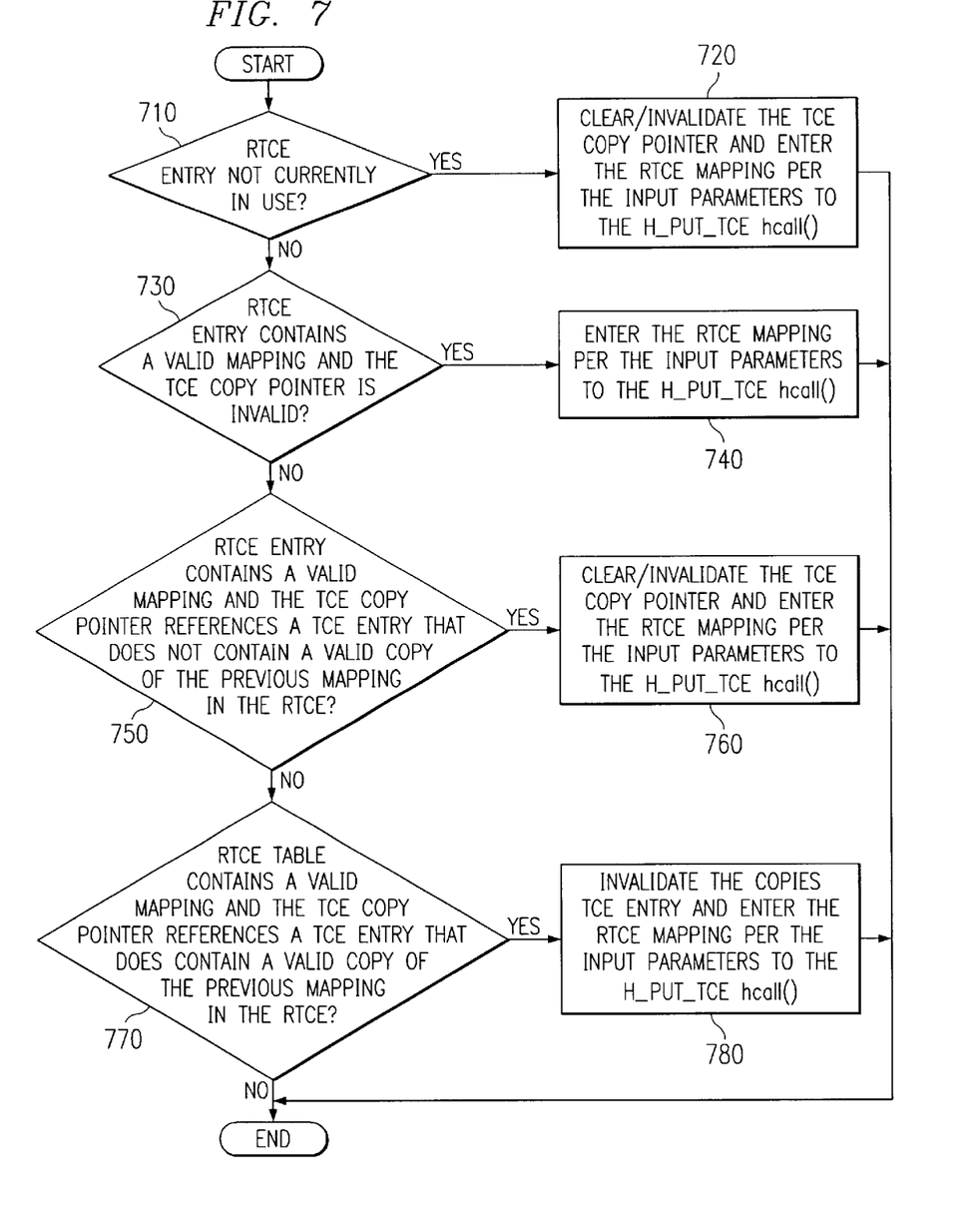
FIG. 7 is a flowchart of additions for the hypervisor current function that puts data in the TCE table in accordance with a preferred embodiment of the present invention.

FIG. 7 is a flowchart of additions for the current hypervisor function, called H_PUT_TCE, which puts data in the TCE table in accordance with a preferred embodiment of the present invention. The present invention modifies the current H_PUT_TCE function of the hypervisor to recognize the validated logical I/O bus number of the hosting TCE table as referring to a RTCE table.

A determination is made as to whether the RTCE entry is not currently in use (step 710). If the RTCE entry is not currently in use, the TCE copy pointer is cleared/invalidated and the RTCE mapping is entered using the input parameters to the H_PUT_TCE hcall( ) (step 720) with the process terminating thereafter. Referring again to step 710, if the RTCE entry is currently in use, a determination is made as to whether the RTCE entry contains a valid mapping and the TCE copy pointer is invalid (step 730). If the RTCE entry contains a valid mapping and the TCE copy pointer is invalid, the RTCE mapping is entered using the input parameters to the H_PUT_TCE hcall( ) (step 740) with the process terminating thereafter.

Turning again to step 730, if the RTCE entry does not contain a valid mapping or the TCE copy pointer is valid, a determination is made as to whether the RTCE entry contains a valid mapping and the TCE copy pointer references a TCE entry that does not contain a valid copy of the previous mapping in the RTCE (step 750). If the RTCE entry contains a valid mapping and the TCE copy pointer references a TCE entry that does not contain a valid copy of the previous mapping in the RTCE, the TCE copy pointer is cleared/invalidated and the RTCE mapping is entered using the input parameters to the H_PUT_TCE hcall( ) (step 760) with the process terminating thereafter.

With reference again to step 750, if the RTCE entry does not contain a valid mapping or the TCE copy pointer references a TCE entry that contains a valid copy of the previous mapping in the RTCE, a determination is made as to whether the RTCE table contains a valid mapping and the TCE copy pointer references a TCE entry that does contain a valid copy of the previous mapping in the RTCE (step 770). If the RTCE table contains a valid mapping and the TCE copy pointer references a TCE entry that does contain a valid copy of the previous mapping in the RTCE, the copied TCE entry is invalidated and the RTCE mapping is entered using the input parameters to the H_PUT_TCE hcall( ) (step 780) with the process terminating thereafter.

FIG. 8 is a flowchart of additions for the current hypervisor function, called H_MIGRATE_DMA, which migrates DMA mappings in accordance with a preferred embodiment of the present invention. The present invention modifies the current H_MIGRATE_DMA function of the hypervisor to recognize a RTCE table and process the function accordingly.

A determination is made as to whether the physical pages referenced by the TCE entries specified in the mappings to be migrated belong to the calling partition (step 810). If the pages do not belong to the calling partition, an error value is returned (step 820) with the process terminating thereafter. A determination is made as to whether the mapping being migrated is through the use of a RTCE table (step 830). If the mapping is through the use of a RTCE table, the valid redirected TCE pointer is followed and the redirected mapping is migrated (step 840) with the process terminating thereafter. If the mapping is not through the use of a RTCE table, the process terminates.

Thus, the present invention provides an improved method, apparatus, and computer instructions for sharing virtual I/O facilities of logical partitions with other logical partitions using shared translation control entries. The two current art approaches for sharing I/O facilities of a logical partition with another logical partition have significant operational problems when compared to the present invention. The present invention provides more flexibility than the current method of allocating memory exclusively for inter-partition communication and eliminates problems caused by the current method, such as the difficultly of reclaiming shared resources, memory consumption, error recovery, and limiting the use of the dedicated memory. The current method of copying from and copying to a buffer requires twice the amount of physical buffer storage than the present invention. Also, the present invention reduces the overhead of performing I/O operations in a logically partitioned data processing system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for sharing input/output facilities of a logical partition with another logical partition, the method comprising:

creating a remote translation control entry table on a hosted partition, wherein the hosted partition is the logical partition sharing the input/output facilities owned by the another logical partition;

loading data into the remote translation control entry table on the hosted partition;

receiving the data from the remote translation control entry table on the hosted partition;

storing the data in a standard translation control entry table on a hosting partition, wherein the hosting partition is the another logical partition owning a physical input/output facility to be shared with the hosted partition; and accessing the input/output facilities of the hosting partition using the data stored in the standard translation control entry table on the hosting partition.

2. The method of claim 1, wherein a hypervisor controls access between the hosted partition and the hosting partition.

3. The method of claim 1, wherein multiple logical partitions share input/output facilities of multiple other logical partitions.

4. The method of claim 1, wherein the input/output facilities are at least one of a disk adapter, tape drive, CD drive, DVD drive, token ring adapter, Ethernet adapter, serial port, terminal or timer device.

5. The method of claim 1, wherein the hosted partition and the hosting partition reside on a single computer.

6. The method of claim 1, wherein the hosted partition resides on a first computer and the hosting partition resides on a second computer.

7. A data processing system comprising:
- a bus system;
- a communications unit connected to the bus system;
- a memory connected to the bus system, wherein the memory includes as set of instructions; and
- a processing unit connected to the bus system, wherein the processing unit executes the set of instructions to create a remote translation control entry table on a hosted partition, wherein the hosted partition is the logical partition sharing the input/output facilities owned by the another logical partition; load data into the remote translation control entry table on the hosted partition; receive the data from the remote translation control entry table on the hosted partition; store the data in a standard translation control entry table on a hosting partition, wherein the hosting partition is the another logical partition owning a physical input/output facility to be shared with the hosted partition; and access the input/output facilities of the hosting partition using the data stored in the standard translation control entry table on the hosting partition.

8. The data processing system of claim 7, wherein a hypervisor controls access between the hosted partition and the hosting partition.

9. The data processing system of claim 7, wherein multiple logical partitions share input/output facilities of multiple other logical partitions.

10. The data processing system of claim 7, wherein the input/output facilities are at least one of a disk adapter, tape drive, CD drive, DVD drive, token ring adapter, Ethernet adapter, serial port, terminal or timer device.

11. The data processing system of claim 7, wherein the hosted partition and the hosting partition reside on a single computer.

12. The data processing system of claim 7, wherein the hosted partition resides on a first computer and the hosting partition resides on a second computer.

13. A data processing system for sharing input/output facilities of a logical partition with another logical partition, the data processing system comprising:
- creating means for creating a remote translation control entry table on a hosted partition, wherein the hosted partition is the logical partition sharing the input/output facilities owned by the another logical partition;
- loading means for loading data into the remote translation control entry table on the hosted partition;
- receiving means for receiving the data from the remote translation control entry table on the hosted partition;
- storing means for storing the data in a standard translation control entry table on a hosting partition, wherein the hosting partition is the another logical partition owning a physical input/output facility to be shared with the hosted partition; and
- accessing means for accessing the input/output facilities of the hosting partition using the data stored in the standard translation control entry table on the hosting partition.

14. A computer program product in a computer readable medium for sharing input/output facilities of a logical partition with another logical partition, the computer program product comprising:
- first instructions for creating a remote translation control entry table on a hosted partition, wherein the hosted partition is the logical partition sharing the input/output facilities owned by the another logical partition;
- second instructions for loading data into the remote translation control entry table on the hosted partition;
- third instructions for receiving the data from the remote translation control entry table on the hosted partition;
- fourth instructions for storing the data in a standard translation control entry table on a hosting partition, wherein the hosting partition is the another logical partition owning a physical input/output facility to be shared with the hosted partition; and
- fifth instructions for accessing the input/output facilities of the hosting partition using the data stored in the standard translation control entry table on the hosting partition.

* * * * *